United States Patent Office 3,465,964
Patented Sept. 9, 1969

3,465,964
METHOD OF CONTROLLING SMOG
Barney B. Girden, New London County, Conn.
(R.D. 1, Norwich, Conn. 06360)
No Drawing. Filed Nov. 9, 1964, Ser. No. 409,988
Int. Cl. A01g *15/00;* E01h *13/00*
U.S. Cl. 239—2          3 Claims

ABSTRACT OF THE DISCLOSURE

Control and substantial elimination of smog by producing an upwelling of cold subsurface ocean water adjacent the ocean shore to initiate and sustain onshore winds and enable the heavier oceanic atmosphere to be substitute for the lighter and polluted atmosphere which would otherwise be trapped over the adjacent shore land masses, as by the presence of thermo inversions thereover.

Statement of the invention

The present invention relates, generally, to a method of controlling smog. More particularly, this invention pertains to a method or process of controlling smog, even to the extent of substantially, if not completely precluding the development thereof, generally through the medium of causing the translation of clean oceanic atmosphere to particular locations, such as coastal cities, enabling the effectuation of presenting a clean and healthful atmosphere in overlying relationship with respect to said locations.

Statement of the problem

It is considered readily apparent that the great industrial centers distributed throughout this country, and particularly along the coastal areas are so replete with facilities that inherently tend to introduce harmful elements into the atmosphere as to cause a pollution thereof. It is well known that the metropolis of Los Angeles, California, for example, is faced with this critical problem of the development of smog which has been found to be most critical approximately 100 days out of each year. The smog approaches its greatest concentration during the presence of a thermo inversion, to be described more fully hereinafter, which, when it appears over that metropolis, tends to trap or retain the atmosphere containing the harmful elements of pollution near the surface of the earth. Under certain conditions hereinafter to be described, the "thermo inversion," or mass or layer of warm air, tends to descend towards the surface of the earth, thus increasing the degree of pollution in the atmosphere. During the aforesaid 100 days the thermo inversion belt appears over the metropolis of Los Angeles, it will, of course, appear in the early hours of the morning, much of the time when the population of that city is traveling to work in automobiles and other types of vehicles. Thus, not only is the polluted atmosphere concentrated into a small area by the tendency of the aforesaid thermo inversion belt to descend, but the degree of concentration of pollution is further increased by the exhaust fumes of such vehicles, comprising, for example, carbon monoxide, organic vapors, nitrous oxide, sulphur, and the like. In addition to movable means, the atmosphere over such a metropolis as Los Angeles tends to be polluted by stationary installations, such as county, municipal, and even federal industrial plants which emit certain harmful elements.

The thermo inversion belt, which tends to trap or retain the polluted atmosphere in overlying relationship with the cities of this country lying along the coastal areas, descends when the temperature of the earth's surface along the coast is lower than the temperature of the water adjacent thereto. In accordance with the well-known laws of thermal convection, when this differential thermal condition between the earth's surface and a body of water exists, there results an "off-shore" breeze that, in effect, tends to introduce a void, which, in turn, causes the aforesaid descendency of the "thermo inversion belt." Continuing with the example of Los Angeles, and remembering that this belt appears or is prevalent during approximately 100 days out of the year, and during that period may appear at the early hours of the morning when the temperature of the earth's surface is naturally less than its temperature during mid-day hours, it will be seen that the inversion layer or thermo inversion belt and the offshore breeze can occur substantially simultaneously or at substantially the same time, so that the belt tends to descend and concentrate the polluted atmosphere close to the earth's surface. It is only as the day proceeds or progresses, and the temperature of the earth's surface increases, that the temperature of the latter becomes greater than that of the body of water along the coast line, enabling the introduction of an "on-shore" breeze, which, by the aforesaid laws of thermal convection, hereinafter to be described, causes the inversion belt to ascend, thus further enabling the polluted atmosphere to be conveyed over the mountainous formations that, for example, surround Los Angeles.

Objects of the invention

Having in mind each and everyone of the foregoing, it is an object of the present invention to provide a method or process of controlling smog, even to the extent of substantially, if not completely, precluding the development thereof, generally through the medium of causing the translation of clean oceanic atmosphere to particular locations, such as coastal cities, enabling the effectuation of presenting a clean and healthful atmosphere in overlying relationship with respect to said locations.

Another object of this invention is to provide a method or apparatus for controlling smog, even to the extent of substantially, if not completely, precluding the development thereof, generally through the medium of causing the translation of clean oceanic atmosphere to particular locations, such as coastal cities, said method or process comprising at least the step off introducing an on-shore breeze to cause the ascendency of a thermal inversion belt lying in close overlying relationship with respect to said locations, enabling the effectuation of presenting a clean and healthful atmosphere in said overlying relationship with respect to such locations.

Yet another primary object of the present invention is to provide a method or process of controlling smog, even to the extent of substantially, if not completely, precluding a development thereof generally through the medium of causing the translation of clean oceanic atmosphere to particular locations, such as coastal cities, said method or process comprising at least the steps of lowering the temperature of the surface of the bodies of water adjacent to said locations until the value thereof is less than the temperature of the atmosphere disposed in overlying relationship with respect thereo, to introduce an on-shore breeze that will cause the ascendency of a thermal inversion belt lying in such close overlying relationship, enabling the effectuation of presenting a clean and healthful atmosphere in said relationship with respect to such locations.

Yet another primary object of the present invention is to provide a method or process of controlling smog, even to the extent of substantially, if not completely, precluding the development thereof, generally through the medium of causing the translation of clean oceanic atmosphere to particular locations, such as coastal cities, said method or process comprising at least the steps of disposing mechanical apparatus in predetermined submarine canyons or basins at a selected depth, for causing a forced translation of the colder, deeper water from said selected depths to the surface of a body of water adjacent said locations, and for causing a reduction of the surface temperature thereof to a value less than that of the surface of the earth at said locations, that is, at said coastal cities, to introduce an on-shore breeze for effecting the ascendency of a thermal inversion belt disposed in close overlying relationship with respect to the surface of the earth, enabling the effectuation of presenting a clean and healthful atmosphere in said relationship with respect to such locations.

A further primary object of this invention is to provide a method or process of controlling smog, even to the extent of substantially, if not completely, precluding the development thereof, generally through the medium of causing the translation of clean oceanic atmosphere to particular locations, such as coastal cities, said method or process comprising at least the step of introducing a relationship between the atmosphere of a body of water, and the atmosphere above the surface of the earth at said locations, that corresponds to the phenomena of thermal convection, to cause the acendency of a thermal inversion belt above the earth's surface, enabling the effectuation of disposing a clean and healthful atmosphere above the surface of the earth at said locations.

Other objects and important features of the present invention will be apparent from a study of the specification following which describes and discloses what is now considered to be the best mode of practicing the principles thereof. Modifications may be suggested to those having the benefit of the teachings herein, and such other modifications are intended to be reserved especially as they fall within the scope and spirit of the subjoined claims.

Description

The present invention is particularly applicable to the coastal areas of any land mass, at which locations there will usually be found numerous cities, and especially large cities such as New York, San Francisco, and Los Angeles in the United States, Southampton and Portsmouth in England, Le Havre in France and the like. In order to facilitate an understanding of this invention, however, it will be described as applied to Los Angles, Calif.

Generally, the atmosphere is, in effect, automatically cleaned by the phenomena of thermal convection. This is a familiar phenomenon, consisting in the transfer of heat by the automatic circulation of a fluid (liquid or gas) due to differences in temperature and density. While water and liquids generally are poor conductors, a kettle of water for example is quickly heated throughout by applying heat at the bottom. The warmer water being less dense, is compelled to rise by the colder water, which, sinking to the bottom, is warmed in its turn. Gasses similarly exhibit the same characteristics of convection, and, therefore, the motion of the air in hot-air furnaces and in the winds of the atmosphere are good examples. And, with respect to the latter, in complying with the characteristics of this phenomena, the warmer polluted atmosphere will ascend, while the cooler, cleaner and heavier atmosphere descends.

With respect to the coastal areas of a land mass, bordering upon a body of water of water, and considering now the example of the city of Los Angeles, a relationship exists between the atmosphere above the body of water and the atmosphere above the surface of the earth at that location. More particularly, it will be understood that during the daytime the temperature of the surface of the earth is warmer than that of the surface of the adjacent body of water. This differential temperature results in an "on-shore" breeze, enabling the cooler, heavier atmosphere over the water to be translated towards the city. Accordingly, and because of the aforesaid phenomena of thermal convection, the warmer, lighter atmosphere over the city is caused to ascent, enabling the fresh, clean and heavier air to be substituted therefore. However, the temperature of the earth's surface decreases as day becomes night, until very often the value thereof is less than that of the surface of the body of water adjacent thereto, and, in the case of Los Angeles, this body of water, is, of course, the Pacific Ocean. When this temperature differential exists, then an "off-shore" breeze is introduced. If a thermo inversion layer is present at this time, the "off-shore" breeze bleeds the atmosphere out from under the inversion belt, thus enabling the inversion belt to tend to descend, and causing an accumulation of polluting elements that result in an extreme concentration of "smog" that remains until the temperature differential is reversed, and an "on-shore" breeze is introduced as hereinbefore introduced.

The atmosphere is a mobile mass that is capable of being moved, in accordance with the aforesaid phenomena, of thermal convection, by minimal temperature differentials. For example, it has been found that a temperature differential of five degrees between the atmosphere of the earth's surface and the atmosphere above the surface of a body of water bordering upon a land mass will result in a strong and rather substantial "on-shore" or "off-shore" breeze, depending upon the direction in which the temperature differential exists. An "on-shore" breeze will continue for a substantial distance inland if the surface of the earth is relatively flat.

In the city of Los Angeles, it has been found that an "on-shore" breeze subsists twenty-four hours a day for a period that approximates forty days of each year. This "on-shore" breeze is directed toward and over the city, so that the atmosphere thereabove in accordance with the aforesaid phenomena of thermal convection, is constantly, in effect, circulating so that the tendency towards the accumulation of polluting elements that is "smog" is substantially, if not completely, eliminated. However, as just pointed out, this "on-shore" breeze subsists only for approximately forty days of each year, so that for the remaining period of the year an "off-shore" breeze tends to obtain at least during the early morning hours, for the reasons pointed out above. At that time of each day, then, there is a distinct tendency toward the accumulation of polluting elements if an inversion belt covers the area, resulting in the ever prevalent "smog" over this city. Moreover, it has been found that during the period approximating 100 days of each year at the location of this city, namely, Los Angeles, a layer of warm air tends to appear thereover. This layer of warm air is of lower altitude than the atmosphere that would ascend if an "on-shore" breeze were introduced and the atmosphere over the city was circulated in the manner aforesaid. Accordingly, this layer of warm air, which may be denoted as a thermal inversion layer, tends to trap the cooler atmosphere closer to the earth's surface and presents the natural circulation or ventilation process that would substitute fresh air for "smog" in the manner aforesaid.

It will now be understood that the degree of concentration of polluting elements in the atmosphere is a function of the degree of promixity of this thermal inversion belt with respect to the earth's surface. Moreover, the accumulation of polluting elements, that is the degree of "smog" continues until the temperature of the earth's surface increases, to a value greater than that of the surface of the body of water bordering thereupon, and an "on-shore" breeze is thus introduced to translate the cooler oceanic atmosphere into overlying relationship with respect to the earth's surface, to cause an ascendency of the thermal inversion layer, and enable the cooler, clean and heavier atmosphere to be substituted for the warmer, lighter and polluted air.

As hereinbefore pointed out, the thermal inversion belt subsists over the city of Los Angeles during the period of approximately 100 days each year. As also hereinbefore pointed out, the temperature of the earth's surface in the early morning hours is less than that of the surface of the surrounding body of water, so that an "off-shore" breeze exists, thus, in effect, introducing a void above the earth's surface, enabling the thermal inversion layer to descend, and it is at this time that the population of that city is proceeding towards work, introducing large quantities of polluting elements, such as carbon monoxide, nitrous oxide, sulphur and the like into the atmosphere. The quantity of such elements is further increased by the presence of commercial, industrial and household installations. Not only is the degree of "smog" increased in this manner, therefore, but because of the presence of the aforesaid thermal inversion layer which tends to descend when there is an "off-shore" breeze.

In summary, then, it can be said that the degree of pollution or "smog" subsisting in the atmosphere overlying the surface of the earth is greatest when a thermal inversion layer is present and an "off-shore" breeze exists. And, the degree of this condition continues to increase until an increase in temperature above that of the surface of the body of surrounding water introduces an "on-shore" breeze, thus, in effect,, introducing a force which causes the ascendency of the thermal inversion layer, and a substitution of the cooler, heavier and clean oceanic atmosphere for the warmer, lighter and polluted atmosphere. The present invention contemplates the substantial, if not complete, elimination of "smog" over Los Angeles, as well as over any other city bordering upon a body of water. It is intended that this be accomplished by a method or process of, in effect, reversing the aforesaid "off-shore" breeze that causes a void and a descendency of the thermal inversion layer, and introducing an "on-shore" breeze to translate the clean, clear and heavier oceanic atmosphere over the city, causing an ascendency of the inversion layer and a substitution of this air for the warmer, lighter and polluted atmosphere. As hereinbefore pointed out, the atmosphere is a mobile mass that can be readily moved to introduce strong land or sea breezes when a relatively minimal temperature differential subsists. It has been found that the temperature differential between the earth's surface at Los Angeles and the surface of the Pacific Ocean at that location is relatively minimal in the early hours of the morning, and more particularly, it has been found that this temperature differential can be overcome if the temperature of the surface of the water is decreased by an amount approximating five degrees below the low land temperature. Obtaining this result will cause or introduce an "on-shore" breeze that preferably should be initiated just before the "smog" occurs, that is, in the early hours of the morning—when the temperature of the earth's surface usually decreases to a point lower than that of the ocean.

The submarine topography of the California coast at Los Angeles has been found to present a chain or string of submarine canyons and basins located adjacent to coast line and being substantially near or adjacent to the waters edge. Additionally, it has been found that the Los Angeles coastal area presents a series of basins that approximate a total area of 6500 square miles with a depth ranging or varying from 3,000 to 6,400 feet.

In the month of August, in the city of Los Angeles, it has been found that the temperature of the Pacific Ocean at the surface thereof is approximately 20 degrees. In addition, it has been found that the temperature of the ocean decreases substantially in accordance with the following schedule, it being remembered that decrease in temperature is a function of increase in depth:

100 meters—6.89 degrees
200 meters—6.71 degrees
362 meters—4.77 degrees
651 meters—3.81 degrees
1120 meters—2.96 degrees Furthermore, it has also been found that daily temperature changes in the Pacific Ocean do not appear at depths of between 10 and 20 meters, nor can there be detected annual changes in the temperature below a depth of 200 meters. At this point, it is noted that a gallon of ocean water at five degrees weighs .01466 pound more than it weighs at 20 degrees, that is, less than 30 pounds per ton. It will therefore be understood that raising or lifting 30 pounds of ocean water at the rate of 1,000 feet per minute, represents approximately one horse power, when it is remembered that one ton of ocean water represents a volumetric equivalent of 30 cubic feet.

In accordance with the above, the placing, positioning or disposing of suitable pumping apparatus in a predetermined number of the aforementioned submarine canyons or basins at selected locations would be capable of lifting or raising the deeper and colder water towards the surface thereof. It is contemplated that the inlets to the pumping apparatus would be located at a depth of approximately 100 meters. A lifting or raising of the colder and deeper water from that depth, and a turbulent mixing of this water with the warmer water at the surface, would enable a decrease in temperature of the surface water until the desired value is obtained, that is, until the temperature of the surface of the water has been reduced to a value that is less than the temperature of the atmosphere above the city by a differential of approximately five degrees. Thus, whenever a thermo inversion layer is imminent, the colder, deeper water will be caused to upwell from a sufficient depth with adequate motion to cause a turbulent mixing with the surface water until the desired differential in temperature between that of the atmosphere at the surface of the water and that of the atmosphere above the city result in an "on-shore" breeze in the manner aforesaid. In effect, then, a force would be introduced that would cause the inversion layer to ascend, thus turbulently mixing with the colder, clearer and heavier atmosphere of the ocean with the warmer, lighter and polluted atmosphere of the city, and permit effective thermal convection, all in the manner as aforesaid. This will be continued until the surface of the earth becomes sufficiently warm to enable the introduction of nature's own "on-shore" breeze.

While certain terminology has been used herein to facilitate an understanding of the present invention, it will be understood that such terminology is not in any way to be considered limiting. For example, the term "substitute" has hereinbefore been used a number of times with reference to the maner in which the phenomena of thermal convection enables clear, cooler, and heavier atmosphere to be substituted for or mixed with the warmer and lighter atmosphere that contains harmful elements of pollution. This language, for example, is intended to facilitate an understanding of the present invention, rather than there be any intent to be limiting, as just pointed out, and, therefore, it is intended in its broadest possible sense. Such language, and other similar language, is accordingly to be attributed with the broadest possible interpretation, construction, definitions, and the like.

While the invention has hereinbefore been described and disclosed in the form of one example manifesting the principles thereof, the scope of the invention should not be deemed limited by the precise example as aforesaid, such other examples intended to be reserved especially as they fall within the scope of the claims here appended.

What is claimed is:

1. A method of controlling smog even to the extent of substantially, if not completely, precluding the development thereof, comprising at least the steps of:

causing a substantial mixing of cool, deep water with the warm water at the surface of a body thereof, bordering upon the earth's surface at predetermined locations to reduce the temperature at said surface to a value less than that at the earth's surface to cause an on-shore breeze when the temperature of the earth's surface is normally less than that at the body of water, enabling the heavier oceanic atmosphere to be substituted for the lighter and polluted atmosphere at said locations by the phenomena of thermal convection.

2. A method of controlling smog even to the extent of substantially, if not completely, precluding the development thereof, comprising at least the steps of:

causing a substantial mixing of cool deep water with the warm water at the surface of a body thereof bordering upon the earth's surface at predetermined locations to reduce the temperature at said surface to a value less than that of the earth's surface to cause an on-shore breeze when the temperature of the earth's surface is normally less than that at the body of water, and a thermal inversion belt is disposed in overlying relationship with the earth's surface at said locations, enabling said inversion belt to be caused to ascend and further enabling the heavier oceanic atmosphere to be substituted for the lighter and polluted atmosphere at said locations by the phenomena of thermal convection.

3. A method of controlling smog even to the extent of substantially, if not completely, precluding the development thereof, comprising at least the steps of:

disposing a plurality of pumping apparatus in submarine canyons running along the edge of a body of water, bordering upon the coastal line of the earth's surface at predetermined locations; and causing the ascendency of cool, deep water by said pumping apparatus to the surface of said body of water, to turbulently intermingle the cool deep water with the water at said surface, and reduce the temperature at that location to a value less than that of the earth's surface at said location when the latter value is normally less than that of the former, and when a thermal inversion belt is normally disposed in overlying relationship with the earth's surface at said locations, enabling said inversion belt to be caused to ascend, and further enabling the heavier oceanic atmosphere to be substituted for the lighter and polluted atmosphere at said locations by the phenomena of thermal convection.

References Cited

Weather Modification & Smog, by M. Neiburger, Science, Oct. 4, 1957, vol. 126, No. 3275, pp. 637–645.

Weather Elements, by Thomas A. Blair, 4th edition, 1957, published by Prentice-Hall, Inc., Englewood Cliffs, N.J., pp. 348, 349, 350 and 351 cited.

EVERETT W. KIRBY, Primary Examiner

U.S. Cl. X.R.

239—14